United States Patent Office 3,063,564
Patented Nov. 13, 1962

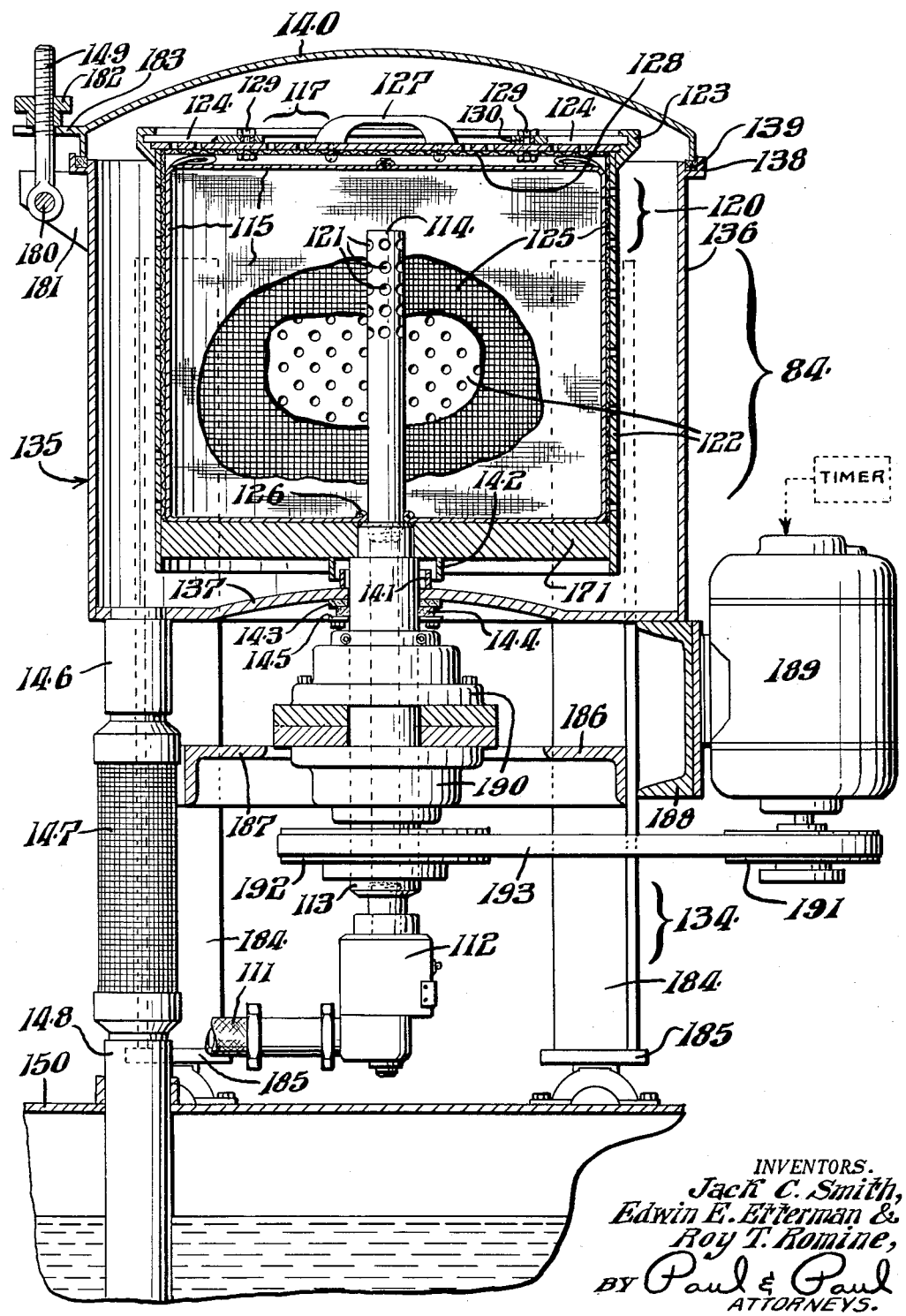

3,063,564
CENTRIFUGAL EXTRACTOR
Jack C. Smith, Edwin E. Etterman, and Roy T. Romine, Bowling Green, Ky., assignors to Detrex Chemical Industries, Inc., Detroit, Mich., a corporation of Michigan
Filed Feb. 24, 1960, Ser. No. 10,767
7 Claims. (Cl. 210—78)

This invention relates to a centrifugal extractor particularly adapted for use in a synthetic dry cleaning operation which is any cleaning operation employing as the basis for the cleaning solution a nonaqueous synthetic solvent, such as a chlorinated hydrocarbon.

On of the major costs in the synthetic dry cleaning process is the cost of the solvent itself. The solvent most widely used today is perchlorethylene. In view of the cost of perchlorethylene, it is necessary to make every effort to reclaim as much of the solvent as possible.

The dry cleaning operation consists essentially of placing the soiled garments or other articles or materials to be cleaned in a bath of perchlorethylene or other synthetic solvent in a suitable container and rotating or otherwise agitating the container so as to subject the garments or other articles to the solvent. The solvent bath must be kept clean in order to perform a satisfactory cleaning operation and, accordingly, it is conventional to filter the solvent constantly to remove the solid soils. This filtering operation is usually performed in what is known as a diatomite filter.

In a diatomite filter, a suitable filter powder, ordinarily diatomaceous earth, is deposited or plated on the inlet side of a porous membrane, which may be of cloth or a metallic screen. The soil-carrying solvent passes through the filter powder and membrane under pressure, and the solid soils in the solvent are caught and held by the filter powder. The solvent, now free of solid soils, is recirculated to the bath to clean the garments.

The filter above described has, of course, only a given capacity to hold solid soils, this capacity being a function of the size of the filter. When the soil-holding capacity of the filter is reached, it is necessary to clean the filter of the soils and filter powder before further satisfactory dry cleaning can be performed.

The operation of cleaning the filter is known to the trade as "backwashing," and the combination of soil and filter powder which is derived from the filter during backwashing is known as "muck." The muck which is removed from the filter is saturated with solvent, and it is this solvent which it is extracted by the centrifugal extractor of the present invention.

Heretofore, solvent has been removed from the muck by various methods, including blowing air under pressure on the muck to dry it, or removing the solvent by heat, or by steam, or by displacement by another liquid of lesser value. All of these prior art methods leave a great deal to be desired, especially from the standpoints of time spent in reclaiming the solvent, the condition of the reclaimed solvent, and probably most important the efficiency of the reclaiming operation.

The centrifugal extractor provided by and operated in accordance with our present invention, provides an improvement in the efficiency of the reclaiming operation (i.e. the percentage recovery of the solvent), in the speed of the recovery, and also in the condition of the solvent recovered. In addition, since the recovery is a cold recovery, it not only prevents the loss of soaps used with the solvent, but improves the working conditions by eliminating a source of heat in the area. Moreover, by avoiding the need of heat in the muck reclaiming operation, more steam is made available for other more profitable operations in the drycleaning plant. The cold process of recovering solvent from the muck also eliminates the need for a condensing surface for the vaporized solvent. In addition, the fact that air under pressure is not used, reduces the losses of the solvent caused through vaporization and incomplete condensation.

It is, of course, true that centrifugal extraction has been used as a means of separating liquids or separating liquids and solids, for many years. As a matter of fact, centrifugal extraction has been tried in the drycleaning field to the extent that muck in a suitable bag or container has been removed from the reclaiming container and then spun in the dry cleaning machine itself or in a laundry type extractor in order to remove additional solvent. Our present invention, however, provides means for and a method of reclaiming the solvent from the filter muck by secondary filtration and centrifugal extraction in an integrated unit.

The centrifugal extractor of our present invention has the following characteristics, all of which are desired for a satisfactory extractor:

First, it acts as a satisfactory filter to insure that all solvent being returned to the system remains free of solid soils. Secondly, it is sized to hold all of the muck contained in the main filter of the system and for a given length of time of operation of the entire system. Third, it receives, holds and filters the muck solution at a working pressure sufficiently below that of the pump of the drycleaning system to insure proper backwashing of the main filter. Fourth, it is able to handle a heavy liquid and a comparatively light solid without undue stress of vibration. Fifth, the muck residue is easily removed from the extractor after the solvent has been recovered. Sixth, the extraction process is more efficient than prior art systems. Seventh, the extraction process time is substantially less than that of the prior art systems. And, lastly, the extractor and its method of operation is economically feasible.

The centrifugal extractor described and claimed in the present application, while not limited thereto, is particularly suited for use in a complete drycleaning machine or system employing a small area filter, such a system being described and claimed in our copending patent application entitled "Automatic Drycleaning Machine, filed February 24, 1960, Serial No. 10,768.

As described in our aforesaid co-pending patent application, pump pressure is applied to the system's main small area filter in the reverse or backwash direction and the muck solution is transferred to the centrifugal extractor through a closed means of conveyance equipped with suitable means of sealing to prevent reverse flow, thus preventing the muck from returning to the main filter when the pump pressure is diverted to filtration flow.

In the description which follows, the system's filter, when referred to, will be referred to as the "main" filter in order to distinguish it from the filter membrane or filter bag which is part of the centrifugal extractor.

The centrifugal extractor of our present invention comprises a perforated container which forms a confining support for a removable filter membrane. The container has an inlet for the muck slurry and an opening for the removal of the dry muck after the extraction process has been completed. The filter membrane is also an enclosed form with an inlet to match that of its supporting container and of such shape (similar to a bag) that it will act as a container for the dry muck and facilitate the removal of the muck after the extraction process has been completed.

The perforated container is so mounted as to be free to revolve. It is driven by a source of power, preferably an electric motor, adapted to cause the container to rotate at a speed high enough to separate the solvent from the muck. The perforated rotatable container is confined in a suitable enclosure for collecting the solvent which is spun out from the muck. This enclosure has an exit which is connected to a suitable means for returning the reclaimed solvent to the dry cleaning system, preferably by means of gravity but not necessarily so.

The centrifugal extractor of our present invention and its manner of operation will be best understood from a consideration of the following detailed description of a preferred embodiment illustrated in the single FIGURE of drawing.

Referring now to the drawing there is there shown an extractor 84 mounted on a solvent storage tank 150. When it is necessary to clean the main filter of the dry cleaning machine or system with which the centrifugal extractor 84 is used, the direction of solvent flow is reversed and the accumulated cake of solid soil and filter powder is washed from the septum elements of the main filter. The removed cake then forms a slurry with the solvent. This muck slurry (comprising solvent, filter powder and solid soils) moves under pump pressure (from a system pump not shown) from the main filter through a discharge line and into a flexible hose 111 (shown in the lower portion of the drawing) through a rotary union 112 (which is fastened to shaft 113 of basket 120), up the hollow shaft 113, and out through holes 121 in an ejector pipe 114 located inside the filter membrane or bag 115. The bag 115 is quickly filled with the muck slurry and expands out against the basket 120 and cover 117. The basket 120 is mounted rigidly to the shaft 113 at the bottom plate 171 which as will be seen is a relatively thick plate. Attached securely to bottom plate 171 is a perforated shell 122 forming the walls of the basket 120. The perforations allow the solvent to escape from the basket 120. Affixed to the top edge of the shell 122 is a ring 123 which provides a seat for the perforated cover 117 and the cover latching arms 124.

For extractors of the size adapted for use with the small area filter system described in our aforesaid co-pending patent application, it is advisable to keep the size and number of perforations in the shell 122 of the extractor 84 down so as to provide sufficient strength to withstand the pressures encountered during the back-washing operation, and so as to withstand the force to which the basket is subjected during the extraction cycle. The size and spacing of the holes has a direct influence on the ability of the filter bag 115 to allow solvent to escape. It was also found that the bag 115 was forced into the perforations of the shell 122 by centrifugal force during the extraction cycle, subjecting the bag 115 to localized strain and at the same time making it difficult to remove the bag from the basket 120, the bag being held by the perforations. Therefore, a basket liner 125 is provided of woven wire cloth to support the bag 115, to increase the unrestricted open area of the bag 115, and to provide inter-connecting channels or passages for the solvent between the perforations of the shell, thus decreasing the restriction to the flow of solvent through the bag 115 and from the basket 120.

The filter bag 115 is preferably made of nylon cloth, but could be made of any material capable of retaining the muck solids and passing the solvent. The bag 115 has one end closed by means of a zipper or other suitable fastening device so that the solids may be removed from the bag after extraction. The bag is then cleaned by some suitable method, such as the dry cleaning process itself, preparing it for reuse. The bag 115 is fitted with a grommet 126 at the end opposite the zipper which fits over the solvent ejector pipe 114, thereby forming a sealed container. To assist in the removal of the bag 115 from the basket 120 handles are sewn to the outside of the bag. In case of a disposable one-operation bag, the zipper or closure means can be dispensed with.

To place bag 115 in the extractor, the cover 117 is removed from the basket 120 and the bag is placed in the basket 120 by putting the ejector pipe 114 through the grommet 126 and sliding the grommet down the ejector until it is in contact with the basket bottom. The zipper is checked to be sure it is closed and the cover 117 replaced on the basket 120. The cover assembly consists of the perforated plate 117 which fits in the seat in the basket ring 123. Attached to the underside of the perforated plate 117 is a cover screen 128 serving the same function as the basket liner 125. However, in the case of the cover 117, the perforations, by allowing the solvent to escape, decrease the effective pressure of the solvent on the underside of the cover. The cover is fitted with a suitable handle 127 to assist in handling. The cover is held in place by latching arms 124 engaging in a groove machined in the basket ring 123. These arms are attached to the cover 117 by means of pivots, in this case, cap screws 129 with nut and washer. To insure free movement of the latch arms 124, a suitable bushing 130 is placed in the arm and around the shank of the cap screw 129. The arms 124 are made longer than the distance from the pivot 129 to the bottom of the groove in ring 123, with the ends cut off at an angle to provide maximum locking surface. In this manner, centrifugal force will cause the cover 117 to be self-latching for safety.

With the cover 117 in place and locked, we have a container with a filter membrane suitable to act as a sub-filter for the muck slurry. As already described above, the muck slurry under pump pressure from the system pump moves from the main filter through the discharge line, through the flexible hose 111, the rotary union 112, up the hollow shaft 113 and out through the holes 121 in the ejector pipe 114. The bag 115 quickly fills with the muck slurry and expands out against the basket 120 and cover 117. The solvent leaves the basket through the bag and the perforations in the basket, leaving the muck solids inside the bag. The perforations in the ejector agitate the slurry to help even the disposition of the slurry solids on the surfaces of the bag. When all of muck slurry has been discharged from the filter, the system's flow control center shuts off the drain line and returns the system's main filter to the filter cycle. When the drain line is closed, the source of continuing pressure is removed from the muck slurry. Hence, the pressure decreases to atmospheric pressure as the solvent passes through the bag. When this condition is reached, the free solvent will slowly drip from the bag due to gravity and the desire of a liquid to seek its own level. This is a slow process due to the resistance of the cake now formed on the inside of the bag.

The solvent escaping from the basket 120 must be confined and collected for return to the storage tank 150 of the dry cleaning machine. To accomplish this solvent collection, the basket assembly is mounted on a frame assembly. In the drawing is shown a frame assembly 134 suitable for use in the extraction recovery process. The frame assembly consists of a cylinder 135 with a solid shell 136 suitably fastened to a bottom 137 to give a liquid-tight seam. The upper or top edge of the shell 136 has affixed a ring 138 arranged to hold a gasket 139 which effects a seal between the cylinder 135 and a removable cover 140. The bottom 137 has two holes, one centrally located through which the basket shaft 113 passes. Attached to the bottom 137 is a ring 141 so disposed as to mate with a similar ring 142 affixed to the bottom of the basket. These rings so arranged as to provide a restriction to the flow of solvent from the cylinder 135 in the event of abnormally high solvent level in the cylinder. Affixed to the bottom of the cylinder is a gasket pad 143 tapped to receive screws. A gasket 144 is compressed around the shaft 113 between the pad 143 and a loose pad 145 by the screws to cause a restriction to the escape of solvent and solvent vapors from the cylinder.

The cylinder 135 has the aforementioned second hole located near the outer edge to form an exit for the collected solvent. Affixed to the underside of the cylinder bottom 137 and surrounding said hole is a fitting 146 which serves as a coupling for a drain line 147. The drain line 147 terminates in a fitting 148 on the storage tank 150. It is preferable that the fitting 148 extend below the liquid level in the storage tank 150 to restrict any fan effort on the part of the basket 120 during the extraction cycle.

A suitable sealing cover 140 is provided for the cylinder 135 with some means of securing the cover to the cylinder and exerting sealing pressure against the gasket 139. In the illustration this is accomplished by securing eye bolts 149 by means of a pivot pin 180 held in ears 181 securely attached to the cylinder shell. Threaded on the eye bolt 149 are handle levers 182 which when screwed down against the pressure pads 183 affixed to the cover, effect a seal on the gasket. The locking system for the cover shown in the drawing is only one of many suitable for this purpose.

The cylinder is supported in the illustration by four legs 184 which are affixed to the cylinder. These legs terminate in pads 185 which provide a means of securing the extractor to a suitable base, in this case, the storage tank 150. Braces 186 and 187 are affixed to the legs to form a support for the bearing mounts. Also, affixed to the legs 184 and the cylinder 135 is a mounting 188 which serves as a mounting for a motor 189 which serves as the source of rotative force to the basket.

The basket 120 is mounted by bearings 190 affixed to the shaft 113. The bearings 190 in turn are mounted on the bearing mount and secured by cap screws to the bearing mount. Thus supported, the basket 120 is free to rotate in the cylinder 135.

The motor 189 is fitted with a sheave 191 and a second sheave 192 is fastened on the lower end of the basket shaft 113. The motor sheave 191 and the basket sheave 192 are connected by a belt 193 so that when the power is applied to the motor the basket 120 is caused to rotate.

We now have a solvent extraction system which will work in conjunction with a dry cleaning system for the reclaiming of solvent from the filter muck, when suitable electrical controls are used in conjunction with the motor 189.

It has been found that the efficiency of the extraction process is related to speed and time of spinning. The amount of vibration encountered is related to how the extractor is brought up to speed, the final speed of spinning, and motor characteristics. These factors have a greater influence on smooth operation than does the initial balance of the basket assembly.

In a typical extraction cycle, the muck slurry is transferred by pump pressure to the bag 115 inside the basket 120. Pump pressure is applied, causing a flow of solvent and slurry to the extractor, and clear solvent to drip out of the extractor as previously explained. The clear solvent, on passing through the bag 115 and basket 120, is collected in the cylinder 135 and from there it returns to the storage tank 150 through the outlet 146 and drain 147. At the completion of the main filter backwash operation, the system flow control shuts off the supply line to the extractor 84 and the residual pressure is dissipated by solvent flowing through the bag 115 and from the basket 120.

The above operation has been explained with the basket 120 at rest. However, the basket could have been spinning, if so desired. The following is an explanation of what takes place when the basket 120 spins under the influence of the motor 189.

When the muck slurry is introduced under pump pressure upwardly through the hollow shaft 113 and ejector pipe 114 and out through the holes 121 in pipe 114, the force of the solvent of the slurry under pressure counteracts the tendency of the soiled powder to settle out and the solids in the muck slurry have a tendency to plate out on the walls of the bag 115 as the solvent filters through. These solids will adhere to the bag 115 forming a concentric cake around the wall of the bag. When the basket 120 starts to spin, any solids remaining in suspension are forced to the wall of the bag 115 and become part of the cake.

It has been found that if the extractor basket is brought up to final speed in a series of steps according to a proper acceleration curve, the final vibration of the unit will be kept to a minimum. The explanation of this highly desirable result is believed to lie in the fact that an undulating, acceleration curve such as is described below allows the slurry while still wet with solvent to be shifted sufficiently on the inside wall of the bag to produce an even coating over the inner surface of the bag wall. In addition, it permits the escape of free solvent from within the bag before the maximum centrifugal force is applied to extract the solvent retained by the sludge. At the same time the load on the motor 189 will be reduced by allowing the majority of the solvent remaining in the muck to be purged from the basket at low speed. In the table given below, the basket 120 is accelerated to the indicated high speed, power is then cut off from the motor 189 and the basket 120 allowed to coast down to the indicated low speed, at which time power is re-applied to the motor 189 to accelerate the basket to the next high speed. The speeds given are in revolutions per minute of a 16″ diameter basket:

0 to 190 r.p.m., 115 to 305 r.p.m.,
225 to 415 r.p.m., 320 to 480 r.p.m.,
400 to 540 r.p.m., 445 to 590 r.p.m.,
510 to 635 r.p.m., 560 to 670 r.p.m.,
590 to 720 r.p.m., 620 to 735 r.p.m.,
655 to 750 r.p.m., 670 to 765 r.p.m.,
685 to 780 r.p.m., 700 to 780 r.p.m.,
720 to 800 r.p.m., 720 to 1380 r.p.m.

It will be noted that, except for the final step, the difference in r.p.m. between low and high speed at each step decreases as the operation proceeds and the solvent is purged from the basket. In the above curve, the differences between low and high speeds are as follows: 190, 190, 190, 160, 140, 145, 125, 110, 120, 115, 95, 95, 95, 80, 80 and 680 revolutions per minute.

The particular acceleration curve given above is but one example of many such suitable curves. The curve can be established by the electrical control circuit as a function of time, or of speeds, or can be designed into the motor.

It has been found that a basket speed of approximately 1380 r.p.m. will recover almost all of the recoverable solvent in a spinning time of 15 to 20 minutes. The residue remaining has far less solvent than does the residue from a cooking operation, as is now customary in the trade. In fact, by this new recovery method, it is possible to extract solvent from muck which has been cooked for six hours in a modern muck cooker.

It has been found possible to bring the extractor up to speed directly with a motor designed to hang on the line for a considerable period of time without damage to the motor.

While the unit shown uses a rotary union to admit the muck slurry to the basket, other means of admitting the slurry to the basket will work although not as satisfactorily. For example, the muck slurry can be brought in the top of the extractor.

The operation of the extractor as described calls for spining the extractor shortly after the completion of the main filter backwash operation. However, this is not a requirement for satisfactory operation. It is possible to allow the basket to drain completely before extraction. It is also possible to backwash into the extractor a multiplicity of times before extracting. The limit in this case is the pressure differential between the extractor and the main filter. A sufficient differential must be maintained to clean the main filter and also to cause the slurry to flow from the main filter into the extractor. Each successive charge of muck will plate out on the walls to the bag increasing the thickness of the deposited cake. As the thickness of the cake increases, the resistance to flow increases until the limits of the system pump are reached. The uniformity of deposit is maintained by the ejector pipe 114 mixing the slurry remaining unplated in the bag with the new change of muck coming into the extractor.

Upon completion of the extraction cycle, the power is cut off to the motor 189 and causes the basket 120 to cease rotating. The lever handles are backed up on the studs 149 relieving the pressure on the gasket 139. When the levers have been backed up far enough to gain clearance, they are swung clear of the power pads. The cover 140 is then removed from the extractor body. The latches 124 on the basket cover 117 are swung clear of the groove in the basket ring allowing the cover 117 to be removed from the basket 120. Bag 115 is then removed by grasping the handles. The dry muck residue is removed with the bag, leaving the basket clear and ready to receive a clean filter bag.

In describing the preferred embodiment of our invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose. In the claims, the terms "a dry cleaning system" or "a dry cleaning operation" are to be understood to refer to a cleaning system or operation in which the cleaning solution is based on a non-aqueous synthetic solvent, as distinguished from an aqueous cleaning solution, which is based on water.

Having described our invention, we claim:

1. In a dry cleaning operation, the method of extracting solvent from muck slurry obtained from backwashing a system filter, said method comprising the steps of delivering the muck slurry under pressure upwardly through a hollow rotatable shaft which extends through the bottom and vertically into the interior of a closed liquid-pervious bag in a rotatable basket having perforated walls, the upper circumferential portion of said shaft having perforations therethrough, and at selected times driving the shaft and basket rotationally from zero to maximum speed in accordance with a preselected series of accelerating steps such that the maximum speed of each step is at least as high as, and in most steps higher than, that of the preceding step, and following each accelerating step allowing the basket to coast down to a speed lower than the maximum speed reached in said accelerating step but higher than the minimum speed for that step, and collecting the filtered solvent.

2. The method as claimed in claim 1 further characterized in that the basket is so accelerated that the difference between the maximum speeds of successive steps decreases as the rotational speed increases.

3. A unitary machine adapted to function both as a non-rotating filter and as a centrifugal extractor for use in a dry cleaning system for reclaiming solvent from muck slurry derived from backwashing the system filter, said machine comprising: a vertically disposed container; a vertically-disposed basket having perforated walls mounted within said container; a closed liquid-pervious filter bag within said basket, said bag and basket having gasketed openings in corresponding locations in the respective bottoms thereof on the vertical axis of said basket and bag; a hollow rotatable shaft passing vertically upwardly through said corresponding openings and terminating inside said bag, said shaft having circumferential perforations along its upper end portion within said bag; means for connecting the lower end of said rotatable shaft to a source of muck slurry under pressure for discharging muck slurry under pressure through said perforations laterally into said bag; means for securing said basket to said hollow shaft for rotation therewith on the vertical axis of said basket; and means for driving said hollow shaft and basket rotationally in accordance with a preselected undulating acceleration curve from 0 to maximum speed, thereby similarly to rotate said basket and bag.

4. A machine as claimed in claim 3 characterized in that said means for driving said hollow shaft rotationally comprise means for rotating said shaft and basket in a series of preselected accelerating steps between each of which said basket is allowed to coast down to a lower speed, the maximum speed of a following step being at least as high as, and in most of the steps higher than, that of the preceding step.

5. Apparatus as claimed in claim 4 characterized in that said container has an exit for the solvent which collects therein.

6. Apparatus as claimed in claim 4 characterized in that said basket as a perforated cover and a thick non-perforated bottom plate.

7. Apparatus as claimed in claim 5 further characterized by the provision of means for collecting the solvent which passes through said exit.

References Cited in the file of this patent

UNITED STATES PATENTS

| | | |
|---|---|---|
| 1,926,995 | Harkness | Sept. 12, 1933 |
| 1,946,500 | Roberts | Feb. 13, 1934 |
| 2,065,978 | Krantz et al. | Dec. 29, 1936 |
| 2,075,175 | Byrd | Mar. 30, 1937 |
| 2,752,044 | Olcott | June 26, 1956 |
| 2,851,164 | Morino | Sept. 9, 1958 |
| 2,950,009 | Bochan | Aug. 23, 1960 |